United States Patent [19]
Jones

[11] Patent Number: 5,563,815
[45] Date of Patent: Oct. 8, 1996

[54] DIGITAL TONE OSCILLATOR FOR CERTAIN EXACT FREQUENCIES AND METHOD FOR GENERATING TONES

[75] Inventor: Cameron W. Jones, Hanover, N.H.

[73] Assignee: Fostex Research & Development, Inc., Hanover, N.H.

[21] Appl. No.: 505,477

[22] Filed: Jul. 21, 1995

Related U.S. Application Data

[63] Continuation of Ser. No. 115,181, Aug. 30, 1993, abandoned.

[51] Int. Cl.$^6$ .................................................... G06F 1/02
[52] U.S. Cl. ........................................................ 364/721
[58] Field of Search ............................................... 364/721

[56] References Cited

U.S. PATENT DOCUMENTS

| | | | |
|---|---|---|---|
| 4,108,035 | 8/1978 | Alonso | 81/1.01 |
| 4,205,574 | 6/1980 | Hoskinson et al. | 84/1.01 |
| 4,279,185 | 7/1981 | Alonso | 84/1.01 |
| 4,338,674 | 7/1982 | Hamada | 364/718 |
| 4,345,500 | 8/1982 | Alonso et al. | 84/1.01 |
| 4,563,932 | 1/1986 | Sunada | 84/1.22 |
| 4,680,479 | 7/1987 | Alonso | 307/265 |
| 5,053,982 | 10/1991 | McCune, Jr. | 364/721 |

OTHER PUBLICATIONS

Appendix A—American National Standard—Time and Control Code—Approved Jan. 29, 1986.

Primary Examiner—David H. Malzahn
Attorney, Agent, or Firm—Sherman & Sherman; Kenneth L. Sherman

[57] ABSTRACT

A digital tone generator includes a modulo adder, an increment number register, two latches and a master clock. The adder continuously adds one of a plurality of predefined increment numbers with the adder's previously generated sums to create further sums and a carry output corresponding to one of a plurality of predetermined output tone frequencies. The system characteristics and increment numbers are selected to correspond to the predetermined frequencies and generate exact tonal frequency signals. The system characteristics and increment numbers are defined using a formula which accounts for the least common multiple of the rational number representation of the predetermined frequencies. In the preferred embodiment, the digital tone generator is used to select and generate one of a plurality of time code tones.

11 Claims, 2 Drawing Sheets

DIGITAL TONE OSCILLATOR FOR CERTAIN EXACT FREQUENCIES AND METHOD FOR GENERATING TONES

This is a continuation of application Ser. No. 115,181, filed on Aug. 30, 1993, for a DIGITAL TONE OSCILLATOR FOR CERTAIN EXACT FREQUENCIES AND METHOD FOR GENERATING TONES, now abandoned.

FIELD OF THE INVENTION

The present invention relates generally to electronic digital audio recording equipment and, more specifically, to a digital tone oscillator that generates certain tones having exact frequency ratios which tones may be used as time code signals for synchronizing communicating audio devices.

BACKGROUND OF THE INVENTION

It is well known in the prior art that certain electrical signals can be used to synchronize a plurality of video and audio recording and editing machines. These electrical signals, commonly known as "Time Code" signals, enhance the value of these machines during the production and editing of audio and video recordings by providing a single reference signal for timing and control purposes.

These "Time Code" signals are standardized and fully described as "ANSI/SMPTE 12M-1986" which is incorporated herein by reference. The "Time Code" signals are commonly referred to as "Linear Time Code" or "SMPTE Time Code".

In use, SMPTE time code consists of eighty (80) bits of information describing timing references and other synchronization information. According to the ANSI standard, the timing code reference describes where along a recording space audio and video information may be found.

Time code describes the entire recording space in terms of hours, minutes, seconds and frames in order to assure that any audio and video information is perfectly synchronized according to human perception. Essentially, using eight decimal digits describing hours/minutes/seconds/frames, the time code can designate where in any twenty four hour period a sound or video signal should be properly placed within human perception.

The most particular designation within the time code reference describes an exact video frame along a series of frames defining an entire moving video image. The time code recognizes that there are exactly a certain number of video frames played in any single second and creates a time code address for every particular frame. In order to do this, the SMPTE standard recognizes that different countries and regions use a different number of frames per second and tries to account for this differing "frame rate" within the time code designation.

Generally, the frame rates which have come into standard practice in the audio and video recording industries, are precisely 30, $30/1.001$, 25, and 24 frames per second (fps). In the Western world, these four frame rates correspond to monochrome (black and white) television (30 fps); color television and video ($30/1.001$ fps); film (24 fps); and European television (25 fps). A digital generator must precisely generate exact frame rate reference signals for each of these standards in order to be useable in multiple countries around the world.

Digital signal generators have typically utilized a series of divider circuits or adder circuits to generate a plurality of digital signals from a single master clock. However, such signal generators are limited in the number of frequencies that can be exactly generated and further suffer from complexity and high cost.

U.S. Pat. No. 4,108,035 to Alonso discloses an electronic music system that converts electrical signals into corresponding sound waves to create musical notes having desired timbres and musical characteristics. Alonso's musical generator uses a note oscillator in an electronic musical system to create synthetic music.

Alonso's note oscillator applies a modulo adder to generate carry pulses at a rate that is controlled by two numbers called an increment number and a divisor number. Using a keyboard, a musician selects notes to be played.

These notes are converted into digital signals and fed into a note calculator which selects the increment and divisor numbers to be used by the note oscillator. The note calculator selects the increment and divisor based upon a sound frequency determinative formula $f_n = CR \cdot (I/(1+B-D))$, where $f_n$ is the frequency, CR is the clock rate, B is the modulus of an adder, I is the increment and D is the divisor.

Alonso's note oscillator is illustrated herein in FIG. 1. As shown in FIG. 1, the selected divisor 26 and increment 27 are input to initial storage circuitry consisting of the divisor number register 32 and the increment number register 34, respectively. The registers 32, 34 continuously feed the stored divisor 26 and increment 27 to multiplexer 40.

Depending upon the value of the gating signal 60, the multiplexer 40 feeds either the divisor 26 or the increment 27 to the modulo 8 adder 44. The adder 44 clocks through addition operations to add an addend AD, consisting of the multiplexed divisor 26 or increment 27, summed with an augend AU, consisting of an accumulated sum of previous additions stored in accumulator 52.

The adder 44 generates a sum S of the augend AU and addend AD. The adder 44 also generates a carry pulse CP when the sum S exceeds the modulo number of the adder 44. When the carry pulse CP is generated the sum S is the remainder of the addition operation and is determinative of the range of addition operations which must be covered before the next carry pulse CP is generated.

The carry pulse CP is thereby generated at the desired audio frequency and is fed through an output latch 58 to both a tone generator for synthesizing musical sound waves, and to the multiplexer 40 as gating signal 60 to multiplex the divisor 26 as the addend AD. When the carry pulse CP is not generated the increment 27 is multiplexed to the adder 44 by multiplexer 40 and the tone generator does not receive an input signal.

The operation of Alonso's oscillator is very complicated. Alonso requires that a note calculator chooses the frequency dependent Increment and Divisor. Alonso must then multiplex between the divisor number and the increment number every time a carry pulse occurs, and a number of attendant registers, memory devices and latches are required to keep track of the increment, divisor and accumulated sums. Furthermore, Alonso's note oscillator is even more complicated by the need to readjust the range of addition which is to be performed by the adder every time a tone generator input is to be produced in proportion to the remainder in response to each carry pulse. Lastly, Alonso's note oscillator is used solely to create an input to a tone generator in order to create synthetic musical tones and is not applied in any other manner.

OBJECTS OF THE INVENTION

It is therefore an object of the present invention to provide an improved digital tone oscillator that can generate certain useful signals in exact frequency ratios to each other.

It is a further object of the present invention to provide a digital oscillator that does not require a multiplexer to select between an increment number and a divisor number.

It is yet even a further object of the present invention to provide a digital oscillator in which the range of next additions does not need to be readjusted in proportion to the remainder in response to each carry pulse.

It is yet even a still further object of the present invention to provide a digital oscillator that can be controlled by a single increment number and does not require the use of a separate divisor number.

It is yet even a still further object of the present invention to provide a digital oscillator that can generate multiple exact frequencies for standard time code synchronization signal generation.

It is yet even a still further object of the present invention to provide a digital time code generator that can provide several frame rates with exact frequency ratios at low cost with few components.

It is yet even a still further object of the present invention to provide a system which can generate tone signals whose frequencies bear precise rational number relationships to one another.

SUMMARY OF THE INVENTION

These and other objects are achieved by the present invention which recognizes that the time code frame rates used as standards in audio and video production may produce audible tones which vary over only a very small frequency range. Even though the standard frame rates vary over a very small frequency range, it is necessary that each time code signal frequency generated be exactly produced for whichever particular standard is selected in order to provide a valid reference synchronization signal as the time code.

The system of the preferred embodiment of the present invention simplifies tone signal generation by applying a formula which uses the principle of least common multiples to define the system characteristics and find precise integer numeric values for the increment numbers, the bit width of the adder and latches, as well as the frequency that is required in the master clock. Using least common multiples, the system defines a common denominator for all of the selected input variables to find a single predetermined common divisor for all of the frequencies to be generated. By finding a common denominator, the system need only choose increment numbers for any selected frequency to be generated, and thereby the need for additional circuitry used to store and select different divisors is eliminated in a tone generator.

The system of the preferred embodiment of the present invention applies the simplified digital tone generator to provide a time code generator which is used to produce exact frame rates using a register, a modulo adder, two latches and a master clock.

In the preferred embodiment, a user chooses a time code standard to be generated as a reference for the audio equipment being used and inputs that time code information using system switches. The system switches provide an address signal to a memory device in order to obtain an increment number which corresponds to the time code chosen.

The memory device outputs an increment number corresponding to the time code signal frequency which is to be produced. This increment number is chosen based upon a formula which accounts for the above discussed system characteristics including the clock speed of the master clock and the adder modulus.

The increment number output from the memory device is stored in a register and is then fed into an adder which continuously adds the increment with the adder's own previous sum to generate carry pulses when the adder's modulus is surpassed. The carry pulses generated are the output oscillation creating an exact time code frequency synchronization signal at the chosen standard. The system of the preferred embodiment of the present invention thereby provides a simple digital tone oscillator which produces tones at certain predetermined particularly exact frequencies.

BRIEF DESCRIPTION OF THE DRAWINGS

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

The following description is provided to enable any person skilled in the art to make and use the invention and sets forth the best modes presently contemplated by the inventor of carrying out the invention. Various modifications, however, will remain readily apparent to those skilled in the art, since the generic principles of the present invention have been defined herein.

Figure 1:
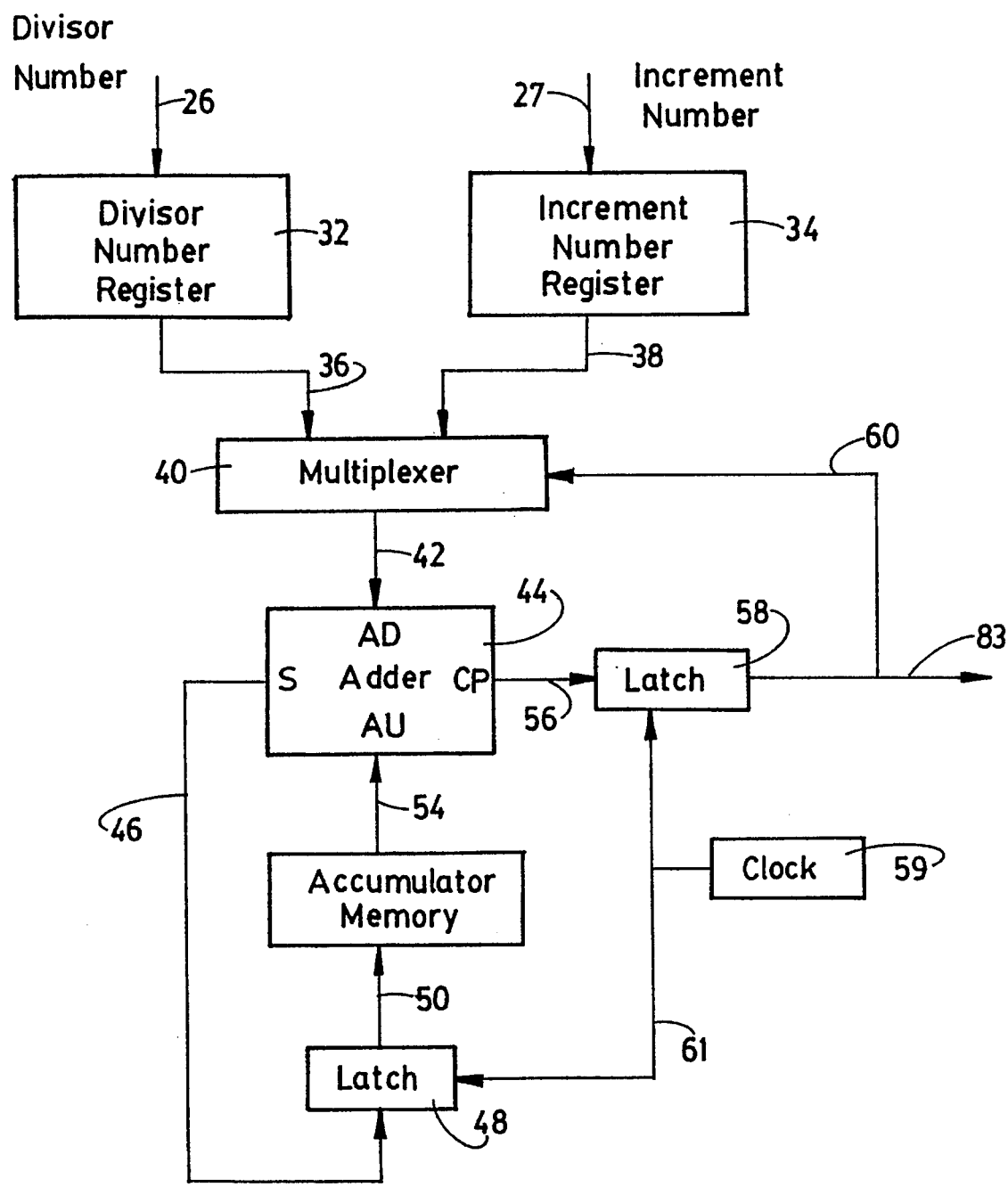
FIG. 1 shows a prior art musical note oscillator to generate a synthetic musical tone.
Figure 2:
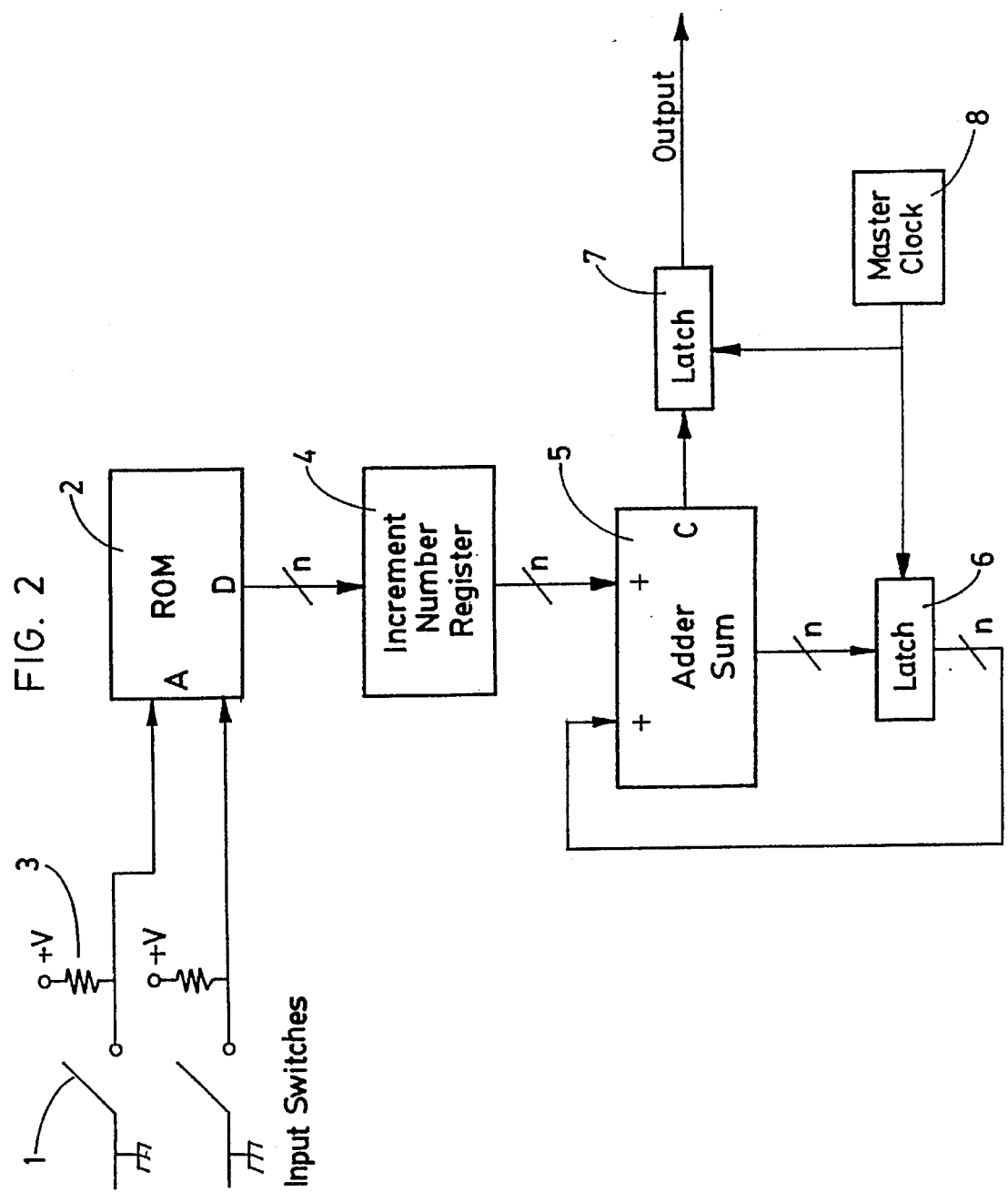
FIG. 2 is an electrical schematic diagram of the preferred embodiment of the present invention.

Referring to FIG. 2, the system of the preferred embodiment of the present invention includes a plurality of frequency select switches 1 which are activated by an operator to select a desired output digital time code signal or tone. A plurality of pull-up resistors 3 provide a high logic level when any corresponding frequency select switch 1 is open.

The signals chosen at the frequency select switches 1 are fed into to the address lines of a read-only-memory 2. Read-only-memory 2 contains the increment numbers which are used by the system to generate each of the particular desired frequencies of the output signal. The data outputs from read-only-memory 2 are fed into an increment number register 4 where the increment number is stored.

A digital modulo adder 5 computes the sum of the increment number stored in increment number register 4 and the prior sum stored in a sum latch 6. The oscillator operates by repeatedly adding the value stored in increment number register 4 to the value stored in sum latch 6 and then transferring the resulting sum back into sum latch 6.

This modulo addition is performed at a rate controlled by master clock 8 (one addition per clock cycle). Adder 5 computes the sum using modulo arithmetic. With modulo arithmetic, only the lower bits of the arithmetic sum are preserved; the upper bits and carry bit are ignored. For example, the sum of 15 plus 5 is normally 20. However, the sum of 15 plus 5 using 4-bit modulo arithmetic is 4. Observe the following example:

Example of 4-bit Modulo Arithmetic

| Decimal | Binary |
|---|---|
| 15 | 1111 |
| + 5 | + 0101 |
| 4 | 10100 |

The lower 4 bits of the sum of 15+5 is 4

The carry output C from adder 5 is fed into an output latch 7. In the example shown above, the carry output C would be the underlined digit which is only generated if the adder modulus is exceeded. The output from output latch 7 is the output signal which is a latched copy of the carry signal C from modulo adder 5.

The master clock 8 is used to clock latches 6 and 7 thus repeatedly computing the sum of the increment number added to the prior value at a rate determined by master clock 8. The final output signal from output latch 7 is a pulse whose frequency is equal to the master clock frequency multiplied the selected increment number divided by the adder modulus.

The preferred embodiment of the present invention uses a particular formula to determine the increment number that must be used for each desired frequency based upon the width (in bits) of adder 5 and sum latch 6, and the frequency of master clock 8. The formula uses the principle of least common multiples to find a precise integer numeric ratio value for the increment number, the bit width of adder 5 and latch 6, and the oscillation frequency to be used for master clock 8. The input to the formula is a list of rational numbers, each specified by a numerator $N_x$ and a denominator $D_x$ (the numeric value of each rational number $X_x$ is equal to $N_x \div D_x$).

The formula computes a common denominator C by multiplying together all the denominators $D_x$. It also computes the number of binary digits that are required to hold the common denominator by finding the smallest power of two that is greater than or equal to the common denominator.

The output of the formula is a list of increment numbers. The increment numbers are computed by multiplying each numerator $N_x$ by the common denominator C and then dividing by the denominator $D_x$. Because the common denominator C is equal to the product of all the denominators $D_x$, it follows that C is divisible by each $D_x$. Therefore, each increment number is an integer and can be precisely stored in read only memory 2 without any roundoff error.

The formula also determines the size (in bits) of the adder and latch to use by finding the nearest power of 2 that can be used. The frequency of the master clock 8 is also determined by the formula. The formula uses the following methodology to determine the required system characteristics and increment numbers.

GIVEN:
$N_1 - N_n$ and $D_1 - D_n$   numerator $N_x$ and denominator $D_x$ for the set of n rational number frequencies that are to be precisely generated where $N_x/D_x$ is the desired frequency in hertz (remove common divisors from each $N_x$ and $D_x$)

V   allowable relative error (jitter) between successive pulse periods produced by oscillator (must be less than .5)

THEN COMPUTE:
C   common denominator = $D_1 * ... * D_n$
P   smallest power of 2 that is greater than or equal to C
Q   smallest power of 2 that is greater than or equal to 1/V
R   smallest power of 2 that is greater than or equal to the highest desired frequency in Hertz AND THEN:
master clock rate to use (hertz)=P*Q*R/C and
width of accumulator to use (bits)=$LOG_2$(P*Q*R) and
increment number to use for each frequency x=$N_x$*C/$D_x$ The preferred embodiment of the present invention uses the following sample calculation to generate standard time code synchronization signals with 0.2% interperiod variation in the system of the preferred embodiment. Desired frequencies=$30/1$ Hz $30000/1001$ Hz $25/1$ Hz and $24/1$ Hz.

Accordingly:
$N_1 = 30$   $N_2 = 30000$   $N_3 = 25$   $N_4 = 24$
$D_1 = 1$   $D_2 = 1001$   $D_3 = 1$   $D_4 = 1$
V = .002
so therefor:
C   common denominator = $D_1 * ... * D_n$ = 1001
P   nearest power of 2 that is greater than or equal to C = 1024
Q   nearest power of 2 that is greater than or equal to 1/V = 512
R   smallest power of 2 that is greater than or equal to the highest desired frequency in Hertz = 32
yields:
master clock rate to use (hertz)   = P * Q * R/C
                                   = 1024 * 512 * 32/1001 Hz
                                   = 16760 456/1001 Hz
and
width of accumulator to use (bits)   = $LOG_2$ (P * Q * R)
                                     = $LOG_2$ (1024 * 512 * 32)
                                     = 24
and
increment number to use for each frequency   = $N_x$ * C/$D_x$
increment number to use for 30 Hz   = 30,030
increment number to use for 30/1.001 Hz   = 30,000
increment number to use for 25 Hz   = 25,025
increment number to use for 24 Hz   = 24,024

Those skilled in the art will appreciate that various adaptations and modifications of the just described preferred embodiments can be used and configured without departing from the scope and spirit of the invention. Therefore, it is to be understood that, within the scope of the appended claims, the invention may be practiced other than as specifically described herein.

What is claimed is:

1. A digital tone generator, comprising:

(a) a modulo adder having a first adder input, a second adder input, a sum output and a carry output, the first adder input being dedicated to receiving one of a plurality of predefined increment numbers;

(b) means for providing the increment number to the first adder input;

(c) means for providing the sum output to the second adder input;

(d) means for applying the carry output as an output time code signal from the digital tone generator; and (e) wherein the means for providing an increment number includes a plurality of input switch means for providing address signals, and further comprising an addressable memory means for receiving the address signals from the input switch means and providing an increment number output determined by the received address signal and an increment number register receiving the increment number output from the addressable memory means, storing the selected increment number, and outputting the increment number to the first adder input.

2. The digital tone generator of claim 1, wherein the means for providing an increment number selects the increment number corresponding to one of a plurality of frequencies of the output time code signal, each of the frequencies corresponding to one of a plurality of time code signal standards to be used in synchronizing electronic audio and video equipment.

3. The digital tone generator of claim 1, wherein the means for providing an increment number provides the increment number asone of a plurality of the increment numbers, the means for providing including a means for defining the increment numbers based upon system characteristics including a bit width of the adder inputs, a frequency of a master clock, and a plurality of desired frequencies of the output time code signal, each of the plurality of increment numbers corresponding to one of the plurality of frequencies.

4. The digital tone generator of claim 1, further comprising a master clock which provides a timing signal to the means for applying the carry output and the means for providing the sum output.

5. The digital tone generator of claim 1, wherein the means for providing the sum output includes a sum latch having a sum latch input and a sum latch output, the sum latch receiving the sum output as the sum latch input and storing the sum output, the sum latch output connected to the second adder input.

6. The digital tone generator of claim 1, wherein the means for applying the carry output as an output tone includes an output latch, the output latch providing the tone signal output.

7. A time code signal generator providing one of a plurality of exact frequency time code output signals, each of the output signals having an output frequency, each output frequency corresponding to one of a plurality of time code signal standards used in synchronizing electronic audio and video equipment, the time code generator comprising:

(a) a modulo adder having at least two adder inputs, a sum output and a carry output;

(b) means for providing an increment number to a first of said adder inputs, the increment number corresponding to one of a plurality of frequencies of the time code output signal;

(c) means for providing the sum output to a second of said adder inputs; and (d) means for applying the carry output as a time code output signal from the time code signal generator; and (e) further comprising an addressable memory means and an increment number register, the means for providing an increment number including an addressable memory means and a plurality of input switch means for providing address signals, an addressable memory means for receiving the address signals from the input switch means and providing an increment number output determined by the received address signal, the increment number register receiving the increment number output from the addressable memory means, storing the selected increment number, and outputting the increment number to the first adder input.

8. The time code signal generator of claim 7, wherein the means for providing an increment number provides the increment number as one of a plurality of increment numbers, the means for providing including a means for defining the increment numbers based upon system characteristics including a bit width of the adder inputs, a frequency of a master clock, and the plurality of output signal frequencies, each of the plurality of increment numbers corresponding to one of the plurality of frequencies.

9. The time code signal generator of claim 7, further comprising a master clock which provides a timing signal to the means for applying the carry output and the means for providing the sum output.

10. The time code signal generator of claim 7, wherein the means for providing the sum output includes a sum latch having a sum latch input and a sum latch output, the sum latch receiving the sum output as the sum latch input and storing the sum output, the sum latch output connected to the second of said adder inputs.

11. The time code signal generator of claim 7, wherein the means for applying the carry output includes an output latch, the output latch providing a tone signal output.

* * * * *